US012276414B1

(12) United States Patent
Almoaibed et al.

(10) Patent No.: US 12,276,414 B1
(45) Date of Patent: Apr. 15, 2025

(54) HEMISPHERICAL LIGHTING DEVICE

(71) Applicant: Imam Abdulrahman Bin Faisal University, Dammam (SA)

(72) Inventors: Deemah Mohammed Almoaibed, Dammam (SA); Noran Kattan, Dammam (SA); Norizzah Khan, Dammam (SA); Duaa Alshurieh, Dammam (SA); Amjad Alshehri, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 18/829,371

(22) Filed: Sep. 10, 2024

Related U.S. Application Data

(63) Continuation of application No. 18/498,798, filed on Oct. 31, 2023, now Pat. No. 12,117,152.

(51) Int. Cl.
*F21V 3/02* (2006.01)
*F21S 9/02* (2006.01)

(52) U.S. Cl.
CPC . *F21V 3/02* (2013.01); *F21S 9/02* (2013.01)

(58) Field of Classification Search
CPC ... F21V 3/00; F21V 3/02; F21V 3/049; F21V 21/34; F21V 14/02; F21V 14/025; F21S 6/002; F21S 9/02; F21L 4/04
See application file for complete search history.

(56) References Cited

U.S. PATENT DOCUMENTS

| | | | | |
|---|---|---|---|---|
| 7,040,783 | B1 | 5/2006 | Christianson | |
| 10,928,021 | B2 | 2/2021 | Chien | |
| 11,228,735 | B2 * | 1/2022 | Chien | H04N 7/181 |
| 11,473,754 | B1 * | 10/2022 | Wu | F21V 23/0485 |
| 2002/0085392 | A1 * | 7/2002 | Hajianpour | F21V 3/04 362/186 |
| 2011/0074270 | A1 * | 3/2011 | Van De Ven | F21V 29/717 313/46 |
| 2018/0100642 | A1 * | 4/2018 | Hall | F21K 9/23 |
| 2018/0106461 | A1 * | 4/2018 | Hall | F21K 9/65 |
| 2018/0200618 | A1 * | 7/2018 | Frisco | A63F 13/235 |
| 2020/0099895 | A1 * | 3/2020 | Chien | F21S 8/038 |

(Continued)

FOREIGN PATENT DOCUMENTS

| | | |
|---|---|---|
| CN | 201615378 U | 10/2010 |
| CN | 105003869 A | 10/2015 |

(Continued)

OTHER PUBLICATIONS

Eda Ekmekcioğlu, "Mi Motion-Activated Night Light 2: Innovative Lighting Technology", Xiaomi Products & Reviews, 2022, 4 pages.

*Primary Examiner* — Fatima N Farokhrooz
(74) *Attorney, Agent, or Firm* — Oblon, McClelland, Maier & Neustadt, L.L.P.

(57) ABSTRACT

A lighting unit including a hollow hemispherical body, a hemispherical holder, and a sphere. A center of a bottom half of the hollow hemispherical body contains the hemispherical holder which is configured to hold the sphere. The sphere includes a light source, a translucent portion, and an opaque portion. The light source is disposed inside of the sphere, and the sphere is configured to rotate within the hemispherical holder so as to vary a position of light emitted by the light source through the translucent portion.

18 Claims, 9 Drawing Sheets

(56) References Cited

U.S. PATENT DOCUMENTS

| | | | | |
|---|---|---|---|---|
| 2021/0003267 | A1 | 1/2021 | Haigh | |
| 2024/0297537 | A1* | 9/2024 | Wang | F21S 6/002 |

FOREIGN PATENT DOCUMENTS

| | | | |
|---|---|---|---|
| CN | 206291068 | U | 6/2017 |
| CN | 107339633 | A | 11/2017 |
| CN | 111895337 | A | 11/2020 |
| CN | 216345715 | U | 4/2022 |
| JP | 2004-146315 | A | 5/2004 |

* cited by examiner

HEMISPHERICAL LIGHTING DEVICE

CROSS-REFERENCE TO RELATED APPLICATIONS

The present application is a Continuation of U.S. application Ser. No. 18/498,798, now allowed, having a filing date of Oct. 31, 2023.

STATEMENT OF PRIOR DISCLOSURE BY INVENTOR

Aspects of the present disclosure were presented at CODEX 23 from Jun. 19-21, 2023 at Imam Abdulrahman bin Faisal University. The presented poster is incorporated herein by reference in its entirety.

STATEMENT OF ACKNOWLEDGEMENT

The support of the Deputyship for Research & Innovation, Ministry of Education in Saudi Arabia for funding this research work is gratefully acknowledged.

BACKGROUND

Technical Field

The present invention generally relates to lighting devices, and more particularly, to a lighting unit configured to allow for varying a position and intensity of light emitted by a light source therein.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Traditional lighting systems, both in residential and commercial spaces, have predominantly been designed to serve the fundamental purpose of providing light. These stationary fixtures, whether ceiling-mounted, wall-affixed, or free-standing, deliver light in a set direction and pattern. The intensity, spread, and directionality of such light sources are generally predetermined by the design of the light fixture and the position in which it is installed. Over the years, these fixtures have become more efficient, versatile, and aesthetically pleasing. However, their basic mechanism and functionality have largely remained unchanged. While traditional lighting systems have efficiently illuminated spaces for decades, they come with inherent limitations.

One of the most significant challenges is their lack of adaptability. Once installed, the direction, pattern, and intensity of the light from a stationary fixture are set, with little to no flexibility for change. This rigidity can lead to areas of uneven illumination, with some parts of a room being over-lit while others remain in shadows. Further, as the purpose or layout of a space changes, the existing lighting may no longer be optimal. For instance, a reading corner may later transform into a relaxation corner, requiring different lighting needs. Additionally, the ambiance, which plays a role in determining the mood and feel of a space, is often hard to modify with traditional lighting fixtures. The ability to change the ambiance of a room without having to replace or install additional lighting fixtures is a challenge that homeowners and interior designers frequently face. Furthermore, those who need to sleep with light, being able to adjust the intensity and positioning is an important factor for sleep quality.

In light of the aforementioned drawbacks, there is a need for a more versatile and adaptive lighting solution that combines the benefits of directionality, ambiance control, and energy efficiency. Accordingly, it is one object of the present disclosure to provide a lighting unit with the ability to focus light on a specific area, set a particular mood, and provide even illumination throughout a space in an easily adjustable manner.

SUMMARY

In an exemplary embodiment, a lighting unit is provided. The lighting unit comprises a hollow hemispherical body. The lighting unit also comprises a hemispherical holder. The lighting unit further comprises a sphere. Herein, a center of a bottom half of the hollow hemispherical body comprises the hemispherical holder which is configured to hold the sphere. Herein, the sphere comprises a light source; a translucent portion; and an opaque portion. Also, the light source is disposed inside of the sphere. Further, the sphere is configured to rotate within the hemispherical holder so as to vary a position of light emitted by the light source through the translucent portion.

In some embodiments, a portion of a perimeter of the bottom half of the hollow hemispherical body is flat and configured to be placed on a surface.

In some embodiments, a portion of the hemispherical holder protrudes from the hollow hemispherical body.

In some embodiments, half of the hemispherical holder protrudes from the hollow hemispherical body.

In some embodiments, the hemispherical holder comprises a rod disposed across a diameter parallel to the hollow hemispherical body upon which the sphere rotates horizontally.

In some embodiments, the hemispherical holder comprises a rod disposed across a diameter perpendicular to the hollow hemispherical body upon which the sphere rotates horizontally.

In some embodiments, the hemispherical holder comprises a rod disposed vertically from a bottom of the hemispherical holder upon which the sphere rotates vertically.

In some embodiments, the hemispherical holder is connected to the hollow hemispherical body by a shelf so as to cover an entirety of the bottom half of the hollow hemispherical body.

In some embodiments, at least one of the hemispherical holder and the hollow hemispherical body is made of an opaque material.

In some embodiments, the opaque material is selected from metal, wood, cement, porcelain, ceramic, and plastic.

In some embodiments, the translucent portion is 1-99% of a surface area of the sphere.

In some embodiments, the translucent portion is at least one color selected from white, red, green, blue, yellow, pink, purple or orange.

In some embodiments, the translucent portion is operably interchangeable so as to change a property of the light emitted by the light source through the translucent portion.

In some embodiments, the translucent portion of the sphere is made of a material selected from glass, plastic, and fabric.

In some embodiments, the opaque portion of the sphere is made of a material selected from metal, wood, cement, porcelain, ceramic, and plastic.

In some embodiments, the lighting unit is electrically connected to a power source so as to power the light source.

In some embodiments, the power source is a battery or an electrical outlet.

In some embodiments, the light source is motion, sound, or mechanically activated.

In some embodiments, the light source is selected from incandescent, compact fluorescent (CFL), halogen, and light-emitting diode (LED).

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
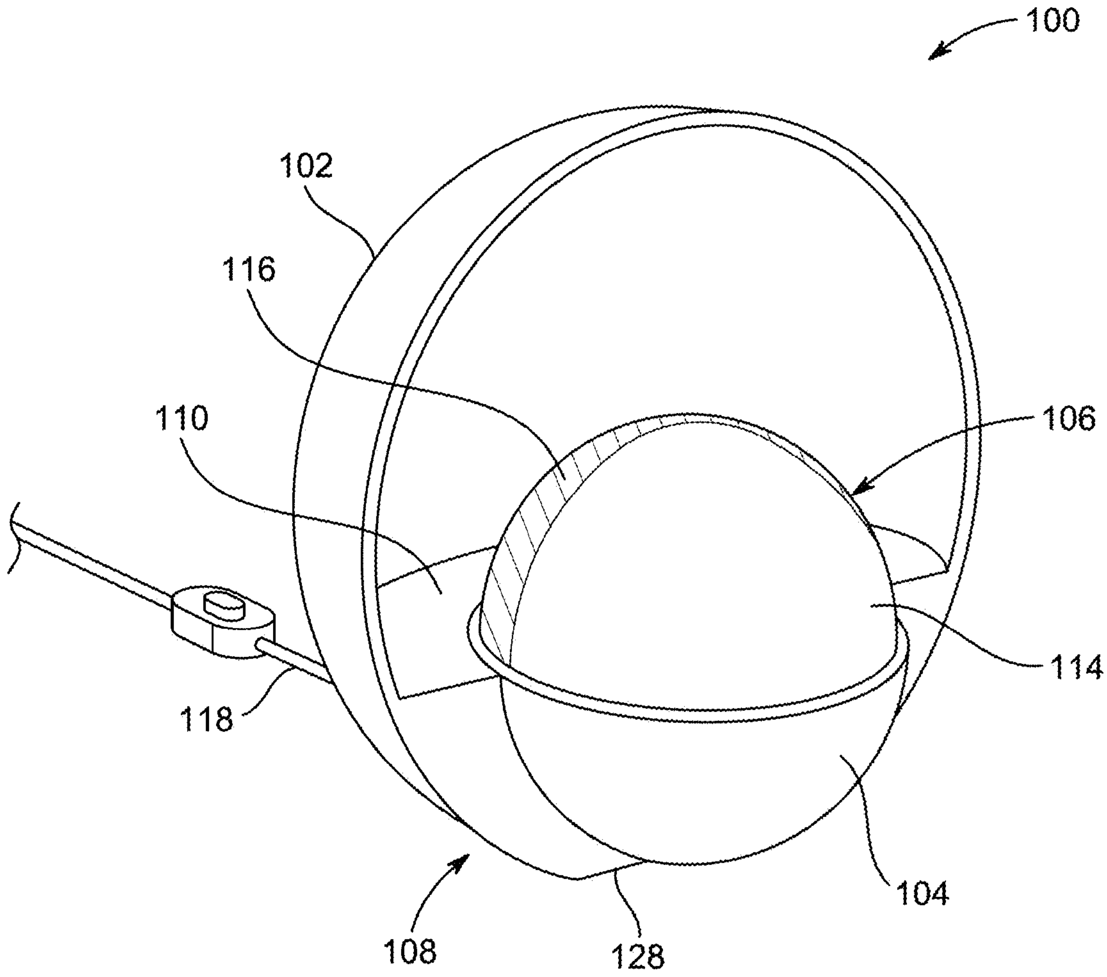
FIG. 1A is a diagrammatic left perspective view of a lighting unit, according to certain embodiments.
Figure 1B:
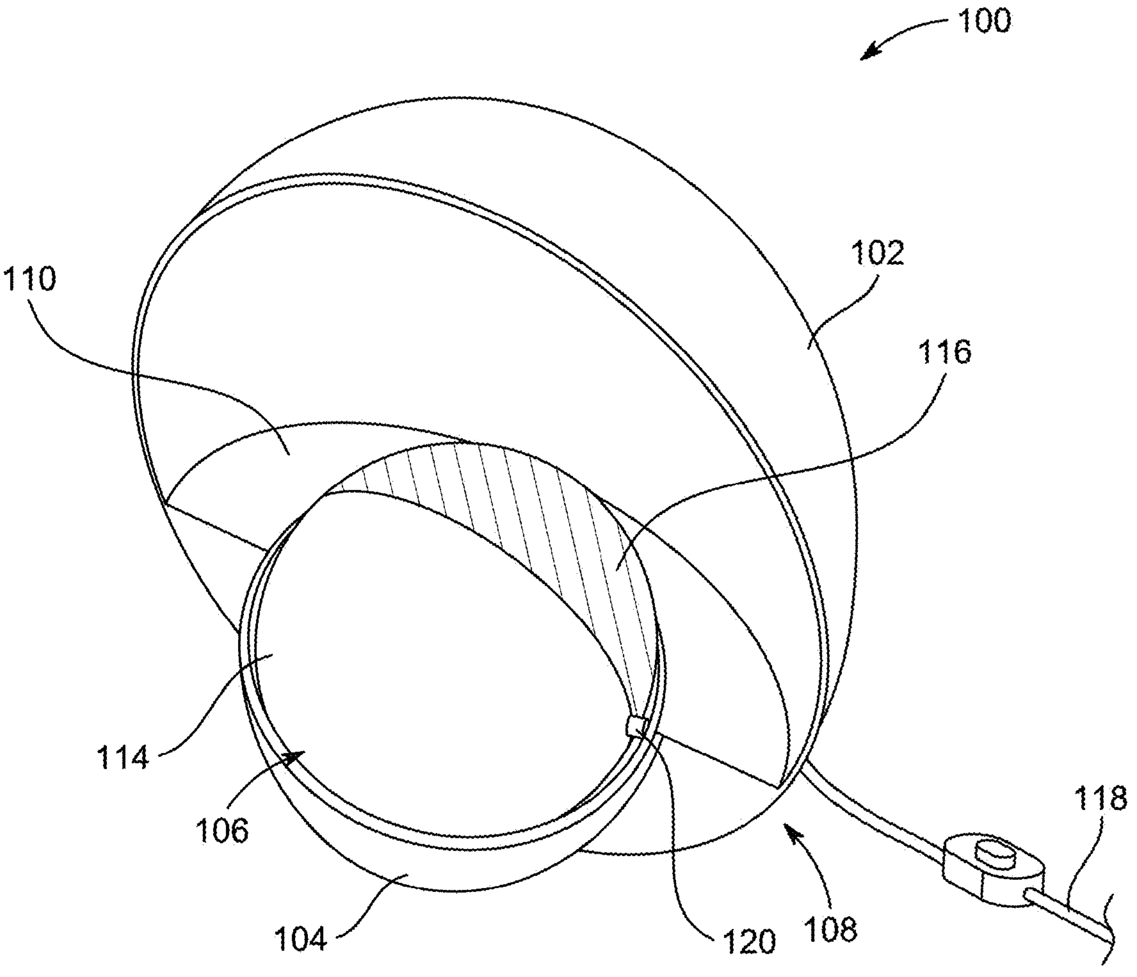
FIG. 1B is a diagrammatic right perspective view of the lighting unit, according to certain embodiments.
Figure 1C:
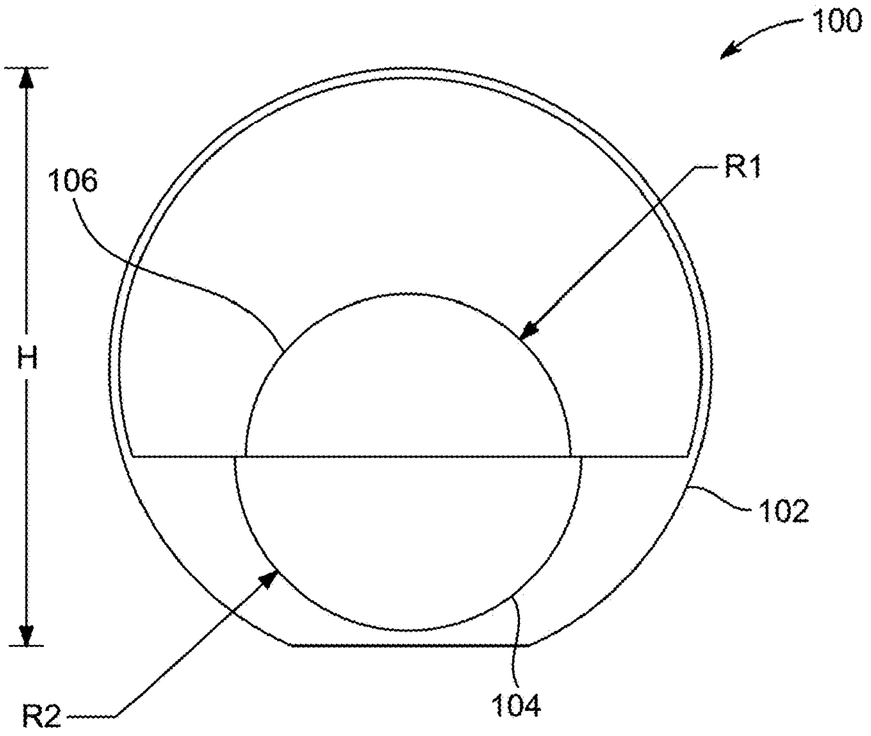
FIG. 1C is a diagrammatic front planar view of the lighting unit, according to certain embodiments.
Figure 1D:
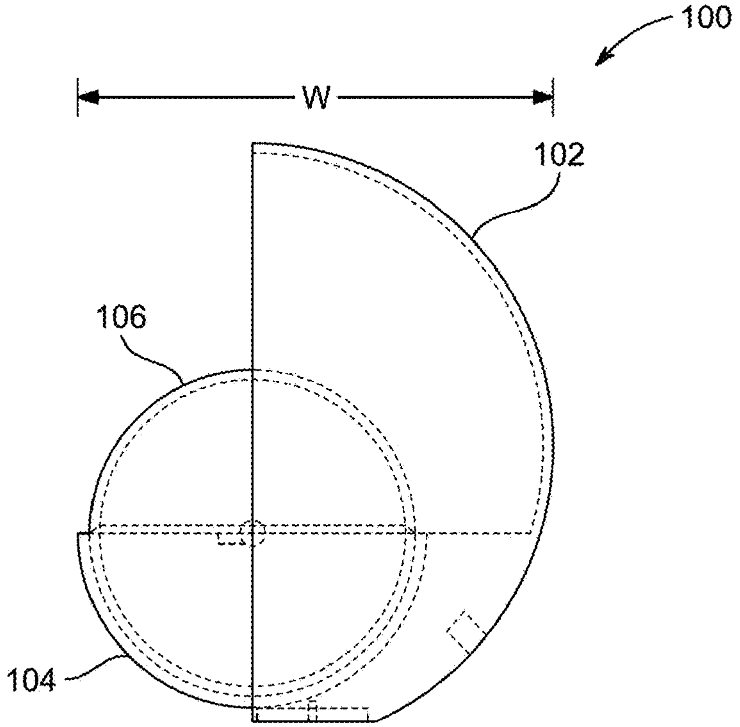
FIG. 1D is a diagrammatic side planar view of the lighting unit, according to certain embodiments.
Figure 1E:
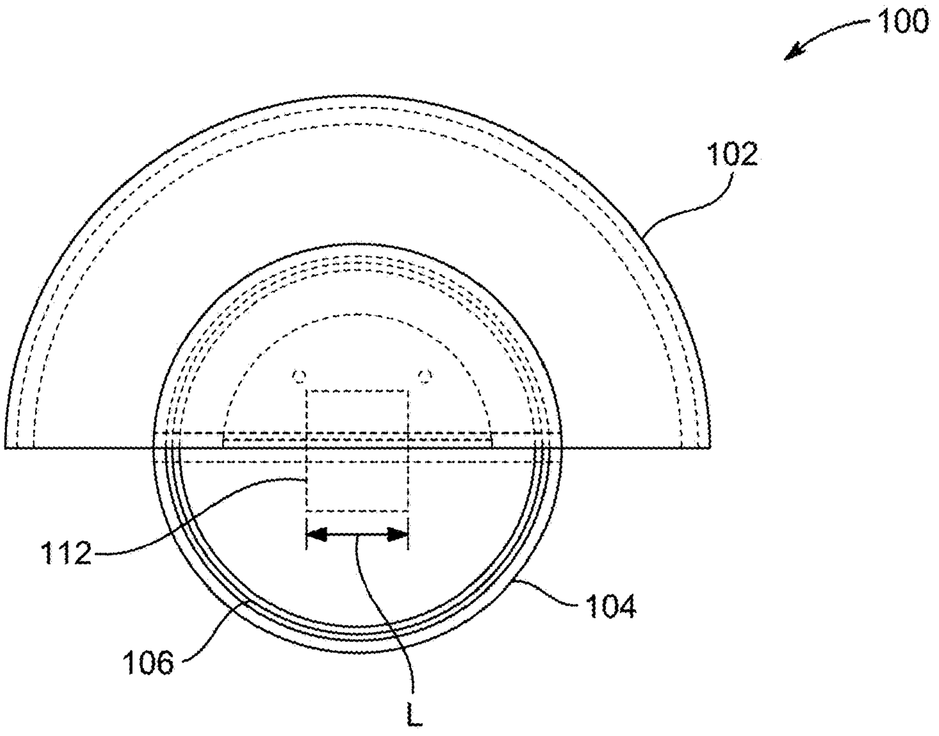
FIG. 1E is a diagrammatic top planar view of the lighting unit, according to certain embodiments.
Figure 1F:
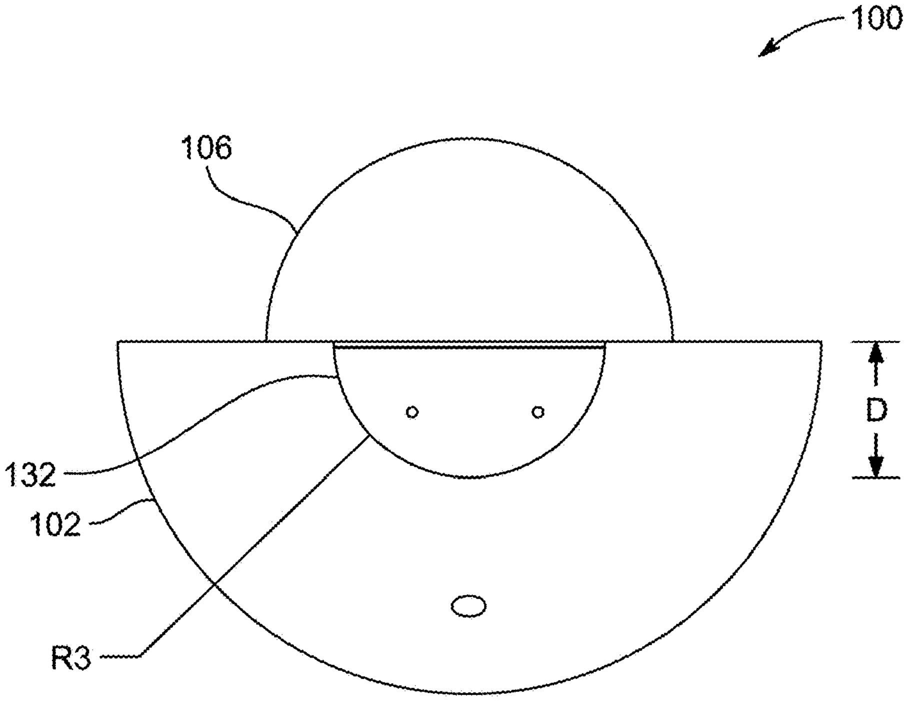
FIG. 1F is a diagrammatic bottom planar view of the lighting unit, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

Aspects of this disclosure are directed to a lighting unit comprising a hollow hemispherical body, a hemispherical holder, and a sphere. Positioned at the center of the bottom half of the hollow hemispherical body is the hemispherical holder, which is configured to hold the sphere. The sphere itself comprises a light source, a translucent portion, and an opaque portion. The light source is placed inside the sphere. The design and arrangement of the sphere allows it to rotate within the hemispherical holder, thus varying the position of light emitted by the light source through the translucent portion.

Referring to FIGS. 1A-1G, illustrated are different views of a lighting unit (as represented by reference numeral 100), according to certain embodiments of the present disclosure. As illustrated, the lighting unit 100 primarily includes a hollow hemispherical body 102, a hemispherical holder 104 and a sphere 106. The lighting unit 100 represents a combination of innovative design with functional adaptability. Unlike traditional lighting fixtures that are often static in their light direction, the lighting unit 100 offers a dynamic approach to illumination. The lighting unit 100 is designed to provide users with the ability to manipulate the direction and illumination of light, catering to specific needs or preferences, with ease and convenience. The lighting unit 100 of the present disclosure is designed not merely to serve as a source of light in terms of functionality, but also presents a combination of aesthetics and user-centric characteristics.

The hollow hemispherical body 102 forms the foundational structure of the lighting unit 100. The hollow hemispherical body 102 provides stability and houses other components of the lighting unit 100. The hollow nature of the hollow hemispherical body 102 has a functional role, allowing for the integration of the hemispherical holder 104 and the sphere 106, facilitating the unique rotational capabilities of the lighting unit 100. The design of the hollow hemispherical body 102 ensures dispersion of light, eliminating sharp contrasts and shadows that are commonly observed in traditional lighting fixtures.

The hemispherical holder 104 is designed to be accommodated within the hollow hemispherical body 102. The hemispherical holder 104, in turn, is configured to hold the sphere 106. Specifically, the hemispherical holder 104 securely accommodates the sphere 106, ensuring smooth rotation while maintaining position of the sphere 106 therein. The hemispherical shape of the hemispherical holder 104, generally, mirrors a curvature of the sphere 106, allowing for rotation without obstructions. Herein, the hemispherical holder 104 provides the necessary support and freedom of movement to allow the sphere 106 to rotate horizontally, vertically, or in any other orientation, enabling users to adjust the light direction with ease and precision (as discussed later in more detail).

In present embodiments, a center of a bottom half (as represented by reference numeral 108 in FIG. 1G) of the hollow hemispherical body 102 comprises the hemispherical holder 104. That is, the hollow hemispherical body 102 is constructed in such a manner that the center of the bottom half 108 accommodates the hemispherical holder 104. This design ensures that the hemispherical holder 104 is securely positioned within the hollow hemispherical body 102, providing a stable and central point for the sphere 106 to be held and rotated. Such a construction not only ensures balance and stability for the entire lighting unit 100 but also facilitates the precise and smooth rotation of the sphere 106 within the hemispherical holder 104.

In some embodiments, the hemispherical holder 104 is connected to the hollow hemispherical body 102 by a shelf 110 so as to cover an entirety of the bottom half of the hollow hemispherical body 102. The inclusion of the shelf 110 provides added structural support, ensuring that the hemispherical holder 104 remains firmly in place, thereby providing a stable base for the sphere 106. The shelf 110 is specifically designed to fill space between the hollow hemispherical body 102 and the hemispherical holder 104. This design ensures that there are no gaps between the interior of the hollow hemispherical body 102 and the hemispherical holder 104. Further, the continuous surface created by the shelf 110 presents a more aesthetically pleasing and cohesive appearance to the lighting unit 100, making it not only functional but also visually appealing. Furthermore, the shelf 110, by covering the entirety of the bottom half of the hollow hemispherical body 102, aids in directing and focusing the light emitted by the sphere 106.

Herein, at least one of the hemispherical holder 104 and the hollow hemispherical body 102 is made of an opaque material. The usage of an opaque material serves to prevent the transmission of light through these components, thereby ensuring that light emission is controlled and directed as intended. The opaqueness ensures that there is no unintended dispersion or scattering of light, which could otherwise lead to inconsistent lighting patterns or reduced illumination intensity. This ensures a more predictable and uniform light distribution, for creating the desired ambiance in any given space.

In certain embodiments, the opaque material for at least one of the hemispherical holder 104 and the hollow hemispherical body 102 is selected from metal, wood, cement, porcelain, ceramic, and plastic. Each of these materials brings with it unique characteristics. Metal, with its durability and robustness, can provide a sleek and modern appearance to the lighting unit 100 while ensuring longevity. Wood, offering an organic aesthetic, can make the lighting unit 100 suitable for more traditional settings. Cement, with its strength and moldability, allows the lighting unit 100 to be made as an art piece. Porcelain and ceramic materials can provide a polished look to the lighting unit 100. Plastic can provide cost-effective option, and further allows for a wide range of design possibilities. In a non-limiting example, the hemispherical holder 104 and the hollow hemispherical body 102 are made of steel with satin nickel coating and smooth texture finish. Further, the hemispherical holder 104 may be painted in black color from the inside thereof. In a preferred embodiment, the shelf 110 is made of the same material as the hemisphereical holder 104 or the hollow hemispherical body 102. In a most preferred embodiment, the shelf 110, the hemisphereical holder 104, and the hollow hemispherical body 102 are made of the same material to provide a cohesive aesthetic.

The sphere 106 is a central component of the lighting unit 100 and functions as the light-emitting element within the lighting unit 100. The sphere 106 includes a light source 112 to provide this functionality. The light source 112 is disposed inside of the sphere 106. The light source 112 maintained in a stationary position at a bottom center of the sphere 106. In some embodiments, the light source 112 is stabilized with an adhesive or is manually attached to the bottom off the sphere 106 for example with a screw. The light source 112 is responsible for generating the illumination that is subsequently directed through the sphere 106.

Structurally, the sphere 106 is characterized by its spheroidal form. Herein, the sphere 106 is partitioned into two segments: a translucent portion 114 and an opaque portion 116. The translucent portion 114 is configured to allow light to pass through it. This structural feature ensures that upon activation of the light source 112, which is placed within the sphere 106, the emitted light can traverse through the translucent portion 114, effectively illuminating the immediate environment. On the other hand, the opaque portion 116 is configured to inhibit or completely block the transmission of light. This provision of the translucent portion 114 and the opaque portion 116 in the sphere 106 aids in directing and shaping the emitted light. By adjusting the orientation of the translucent portion 114 in relation to the opaque portion 116, users can control a position of light emitted by the light source 112 through the translucent portion 114.

The sphere 106, with the translucent portion 114 and the opaque portion 116, combined with the light source 112, is configured to provide adaptive illumination. Herein, the sphere 106 is configured to rotate within the hemispherical holder 104 so as to vary a position of light emitted by the light source 112 through the translucent portion 114. That is, the sphere 106 is arranged to rotate within the confines of the hemispherical holder 104. Such rotation provides users with control over the orientation and focus of the emitted light by the light source 112, through the translucent portion 114 of the sphere 106. In other words, the sphere 106 with its inherent ability to rotate within the hemispherical holder 104 provides users with the flexibility to modify the direction and focus of the emitted light. By manipulating the orientation of the sphere 106, users can exercise precise control over the illuminated areas, customizing the ambiance of their space to their liking, like which areas receive light and which remain in shadow, thus offering a tailored lighting experience. The manipulating is performed by rolling the sphere with a user's hand or other body part. The amount of pressure required to rotate the sphere may be adjusted based on the user's requirements. For example, lighter pressure may be required for young or elderly patients.

In present embodiments, the light source 112 is selected based on specific technical criteria to ensure performance and user satisfaction. In one embodiment, the light temperature of the light source 112 is set at about 3200 k. This temperature is in the lower spectrum of the color temperature range, which results in a warmer, cozier glow. Such a temperature is particularly suitable for environments where a relaxing or intimate ambiance is desired, such as living rooms, bedrooms, or dining areas. Complementing the light temperature, the light appearance emitted by the source is characterized as 'warm white'. This shade of white carries a slight yellowish hue, further enhancing the warmth and coziness of the illumination. In terms of durability and sustainability, the light source 112 is selected to provide life span of at least 50,000 hours, preferably 50,000-200,000 hours, or about 100,000 hours. Further, the light source 112 operates at a voltage of 12-50 volts, preferably about 20 volts. This relatively low voltage ensures energy efficiency while maintaining the brightness and quality of the emitted light.

Various embodiments of the present disclosure allow for different types of light sources. Herein, the light source 112 is selected from incandescent, compact fluorescent (CFL), halogen, and light-emitting diode (LED). Each of these different types of light sources offers unique characteristics in terms of luminosity, energy consumption, and lifespan, thus catering to a diverse array of lighting needs and preferences. For instance, incandescent light source can provide warm glow, making it suitable for spaces where a cozy ambiance is desired. CFL is comparatively energy-efficient than incandescent bulbs and has a longer lifespan, making it suitable for settings where such properties are desirable. Halogen is often chosen for its brighter, whiter light, making it suitable for settings where precise lighting is required. LED is highly energy-efficient, has an extended lifespan, and produces minimal heat, making it suitable for modern lighting solutions. In yet other embodiments, the light source 112 may include advanced lighting technologies, such as smart bulbs, that can be controlled via smartphone apps or voice commands, allowing users to change the light's color, intensity, or even set schedules for automated operation.

In the present embodiments, the lighting unit 100 is electrically connected to a power source 118 so as to power the light source 112. The power source 118 ensures that the light source 112 within the sphere 106 receives the necessary electrical energy to produce light. In the illustrated example, the power source 118 is designated as a power cable providing electrical connection to the light source 112 of the lighting unit 100. It may be appreciated that the lighting unit 100 may be used in diverse settings with varying accessibility to power sources. Herein, the power source 118 is a battery or an electrical outlet. The battery as a power source 118 offers the advantage of portability. By utilizing the battery, the lighting unit 100 becomes mobile, allowing users to place or move it without the constraints of wired connections. This is especially beneficial for settings where electrical outlets may not be readily accessible, such as outdoor spaces. For more permanent setups or where prolonged illumination is required, the electrical outlet may be utilized. By using the electrical outlet as the power source 118, the lighting unit 100 ensures uninterrupted operation. This mode is particularly suitable for indoor settings like living rooms, bedrooms, or offices. By offering multiple options for the power source 118, the lighting unit 100 ensures adaptability to various scenarios and user requirements.

In certain embodiments, the light source 112 is motion, sound, or mechanically activated. For motion activation, the light source 112 may be equipped with motion sensors that detect movement within proximity. When any movement is detected, these sensors trigger the activation of the light source 112, illuminating the environment. For sound activation, the light source 112 may be equipped with a microphone or the like, which gets activated upon detecting specific sound patterns or thresholds, triggering the activation of the light source 112. For mechanical activation, the lighting unit 100 may employ mechanical mechanism(s) to activate the light source 112. This may include mechanisms like push buttons, rotating dials, and the like. The lighting unit 100 may integrate one or more of these modes of activation, enhancing its functionality, user-friendliness, and adaptability to various scenarios. In yet other embodiments, the lighting unit 100 may be equipped with ambient light and motion sensors. These sensors can automatically adjust brightness of the light source 112 based on the surrounding light conditions. For instance, as the sun sets and a room grows dimmer, the light source 112 may gradually increase its brightness to maintain a consistent illumination level.

It may be appreciated that the choice of material for the translucent portion 114 of the sphere 106 also impacts the quality, texture, and diffusion of light emitted by the lighting unit 100. In certain embodiments, the translucent portion 114 of the sphere 106 is made of a material selected from glass, plastic, and fabric. Glass provides a clear passage for light, ensuring bright and consistent illumination. Depending on its treatment and finish, glass can offer varying degrees of translucency, from completely clear to frosted or textured surfaces. Plastic provides flexibility in design and form, as it can be molded into intricate shapes and can be treated to achieve varying levels of translucency. Plastic also provides the advantage of being resistant to breakage, making it a safe option for various settings. Fabric as a material for the translucent portion 114 provides a soft and diffused quality to the emitted light. In a non-limiting example, the translucent portion 114 may be made of translucent ABS with semi-gloss and smooth surface finish. By offering such selection, the lighting unit 100 provides versatility and adaptability to diverse decor styles and user preferences.

Further, the opaque portion 116 of the sphere 106 serves the function of controlling and directing the emitted light, ensuring a focused illumination. The choice of material for the opaque portion 116 adds to the aesthetic appeal, durability and weight of the sphere 106. In certain embodiments, the opaque portion 116 of the sphere 106 is made of a material selected from metal, wood, cement, porcelain, ceramic, and plastic. Similar to the material selection in context of the hemispherical holder 104 and the hollow hemispherical body 102, metal may impart strength and durability to the sphere 106, wood may impart organic aesthetic and elegance to the sphere 106; cement may industrial and contemporary look to the sphere 106; porcelain and ceramic may impart polished and refined appearance to the sphere 106; and plastic may impart lightweight and resistance to breakage properties to the sphere 106. In a non-limiting example, the opaque portion 116 may be made of a plastic with a matte finish. In another embodiment, the opaque portion of the sphere is made with the same material as that of the hemisphereical holder 104, and the hollow hemispherical body 102 to provide a cohesive aesthetic appeal. By providing such selection, the lighting unit 100 ensures that users can select a material that aligns with their design sensibilities and functional needs.

Although, in the illustrated examples, the sphere 106 is shown to be divided into two equal segments of the translucent portion 114 and the opaque portion 116; in other examples, one or other of the two portions may cover larger of a surface area of the sphere 106 without departing from the spirit and the scope of the present disclosure. In certain embodiments, the translucent portion 114 is 1-99%, preferably 10-90%, 20-80%, 30-70%, 40-60%, or about 50% of a surface area of the sphere 106. Such design choice allows for a broad spectrum of light diffusion and intensity levels. For instance, the sphere 106 with a higher proportion of the translucent portion 114 may allow for higher light dispersion, illuminating the environment in a bright and uniform glow. Conversely, the sphere 106 with a lower proportion of the translucent portion 114 may emit a more focused and controlled beam of light, suitable for creating mood lighting or highlighting specific areas. It may be contemplated that such design flexibility extends to the opaque portion 116 as well without any limitations. In general, the lighting unit 100 is designed to be adaptable, and as such, the proportions between the translucent portion 114 and the opaque portion 116 can vary based on specific design requirements or user preferences.

Further, as may be appreciated, color, as an integral aspect of light, plays a role in setting the mood and tone of the environment. Herein, in certain embodiments, the translucent portion 114 is at least one color selected from white, red, green, blue, yellow, pink, purple or orange. Each of these different varieties of colors/hues produces its distinct ambiance when illuminated. For instance, white light can create a neutral and bright ambiance; red light can create a warm and intimate ambiance; green light can be used to create a calming ambiance; blue light can create a cool and relaxing ambiance; yellow light can be used to create a warm and comforting ambiance; pink light can be used to create a party ambiance; purple light can be used to create a luxury ambiance; and orange light can be used to create an energetic ambiance. By providing the translucent portion 114 in such diverse colors, the lighting unit 100 ensures that users can tailor the ambiance of their space according to their desires.

Furthermore, in certain embodiments, the translucent portion 114 is operably interchangeable so as to change a property of the light emitted by the light source 112 through the translucent portion 114. This means that the translucent portion 114 may be conveniently detached and replaced with an alternate translucent segment. This design attribute allows users to modify and adapt the lighting unit 100 based on specific requirements or preferences. As previously discussed, the translucent portion can come in a range of colors, from warm hues like red and yellow to cooler tones like blue and green. This interchangeability allows users to switch the ambiance of a room, like from a calm blue ambiance to a vibrant red ambiance, based on mood or occasion. Further, different translucent portions may have varying levels of translucency. By choosing a less or more translucent segment, users can control the brightness of the emitted light, like from a soft glow to an intense illumination. In some examples, the surface of the translucent portion 114 can have different textures, such as smooth to patterned. By interchanging these, users can introduce different light patterns and effects in the environment. Such a design approach allows users to change the lighting ambiance without needing to replace the entire lighting unit 100. The interchangeable portion can be removed and added through a mechanism such as a snap.

In the present design configuration, the manner in which the sphere 106 rotates within the hemispherical holder 104 provides functionality to the lighting unit 100. In some embodiments, the sphere 106 is held by gravity in the hemisphereical holder 104 and can be rotated in any degree of freedom around in the hemisphereical holder 104. This embodiment provides the user with a wide variety of light distribution options.

Figure 1G:
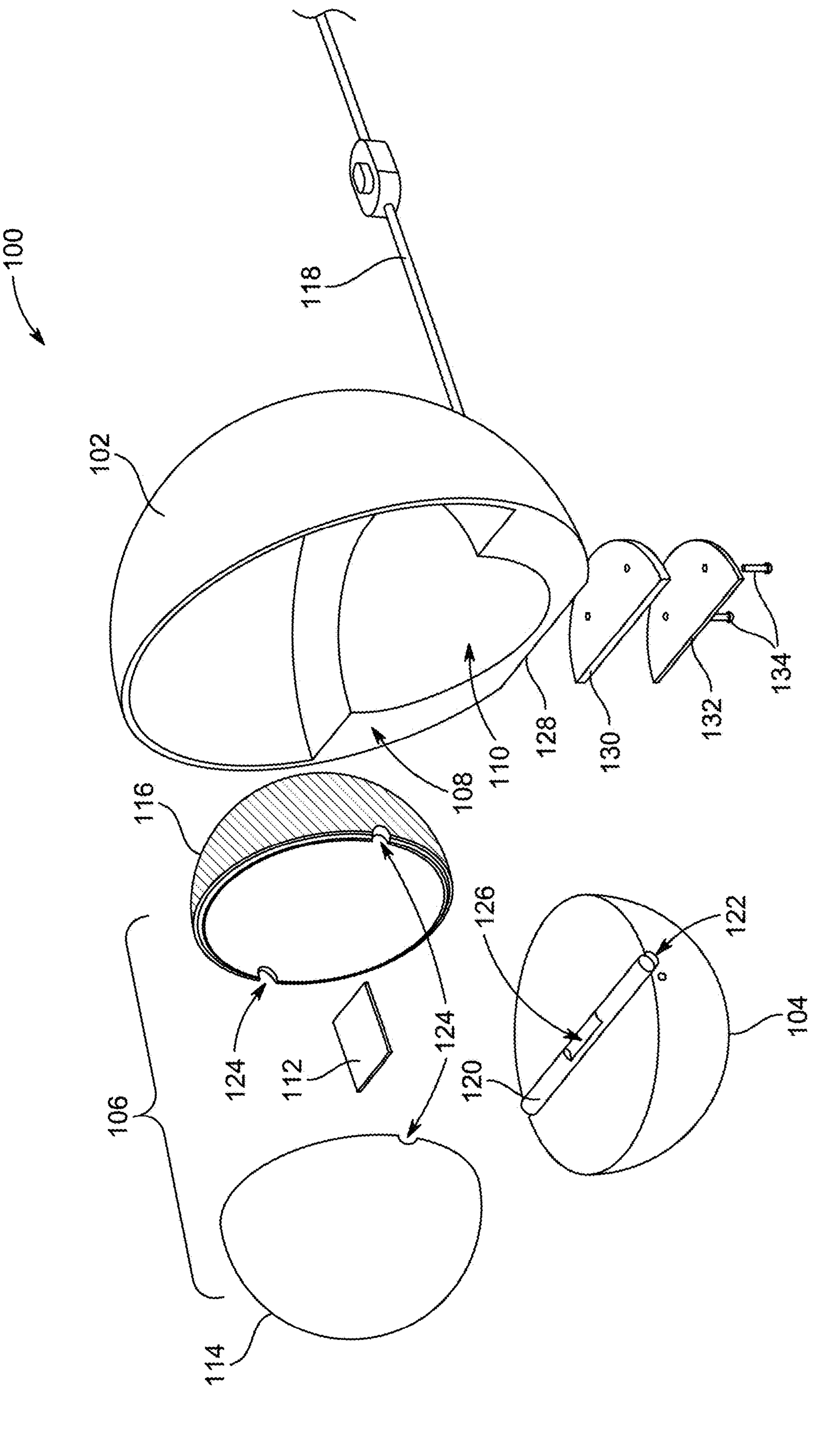
FIG. 1G is a diagrammatic exploded view of the lighting unit, according to certain embodiments.

As illustrated in FIG. 1G, the hemispherical holder 104 may include a rod 120 onto which the sphere 106 is mounted. This allows the sphere 106 to rotate about an axis defined by the rod 120. In present examples, when the rod 120 is placed along a diameter in a plane of a periphery of the hemispherical holder 104, the rod 120 may be fixed on grooves 122, in the form of semi-circular cut-outs, defined in the periphery of the hemispherical holder 104. Further, the sphere 106 may include grooves 124, to be rotatably supported on the rod 120. Specifically, herein, each of the two portions 114, 116 of the sphere 106 may have the grooves 124. This allows the sphere 106 to rotate freely about an axis of the rod 120, or in other words, along a diameter in the plane of the periphery of the hemispherical holder 104. Further, as may be seen from FIG. 1G, in some examples, the light source 112 may be supported on the rod 120 itself, for example on a depression 126 in the rod 120, such that the light source 112 and direction of light emanating therefrom is fixed irrespective of the rotation of the sphere 106. This configuration offers precise control over the lighting direction without altering the overall position or orientation of the lighting unit 100 itself.

Herein, the rod 120 which serves as the rotational axis for the sphere 106 within the lighting unit 100 may be strategically oriented within the hemispherical holder 104 to provide distinct rotational movements for the sphere 106. This, in turn, influences the direction, spread, and intensity of the illumination from the light provided by the lighting unit 100. These distinct rotational dynamics enhance the versatility and adaptability of the lighting unit 100. Various embodiments, as discussed hereinafter, provide for some of the exemplary different rotational axes.

Figure 2:
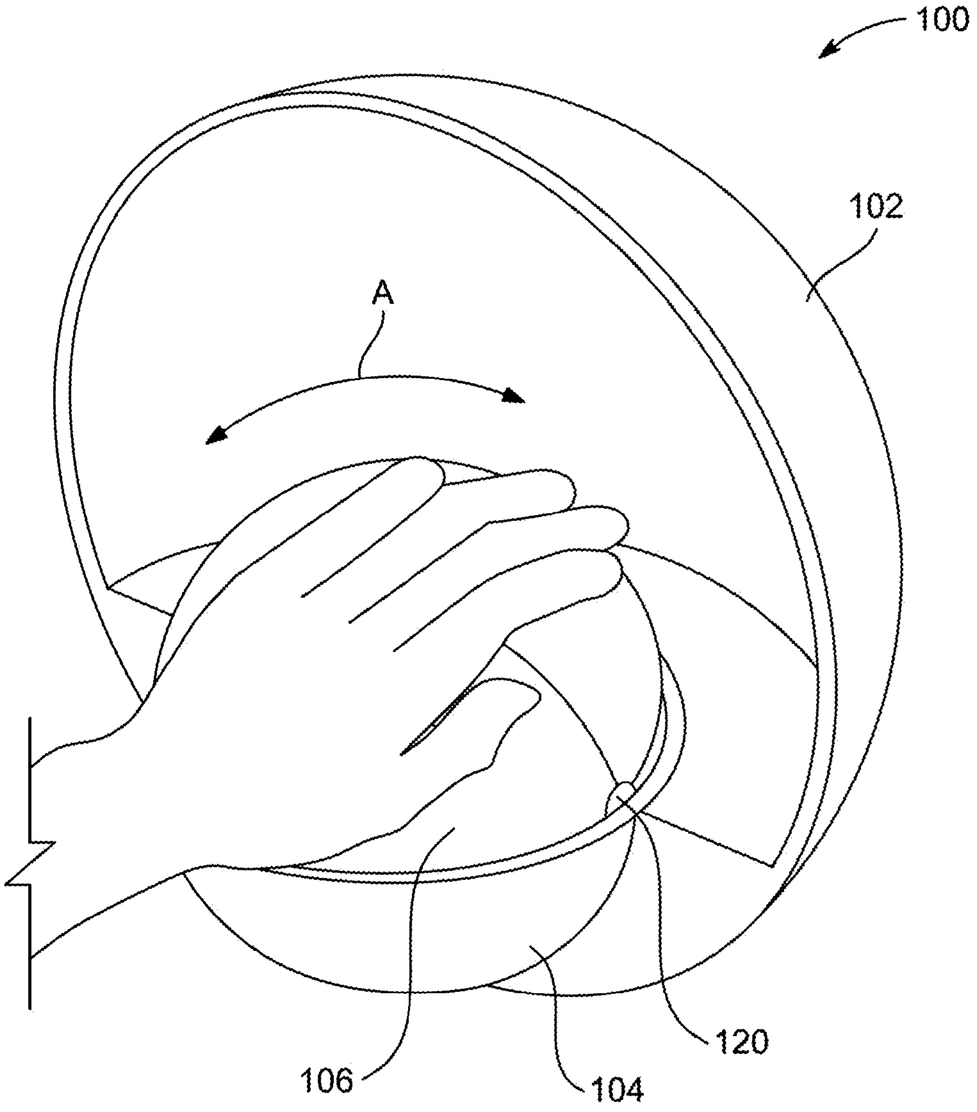
FIG. 2 is an illustration of implementation of the lighting unit, according to a first embodiment.

In a first embodiment of the lighting unit 100, as illustrated in FIG. 2, the hemispherical holder 104 includes the rod 120 disposed across a diameter parallel to the hollow hemispherical body 102 upon which the sphere 106 rotates horizontally. That is, the rod 120 is strategically disposed across the diameter that runs parallel to the hollow hemispherical body 102, and serves as the axis upon which the sphere 106 rotates, facilitating a horizontal rotation (as represented by double-sided arrow 'A'). The two directions of arrow 'A' signify the bidirectional movement capability of the sphere 106, indicating that it can rotate both clockwise and counterclockwise along the rod 120. By rotating along this parallel axis, the sphere 106 can adjust the direction of the emitted light within the horizontal plane, allowing the user to direct illumination towards specific areas or objects.

Figure 3D:
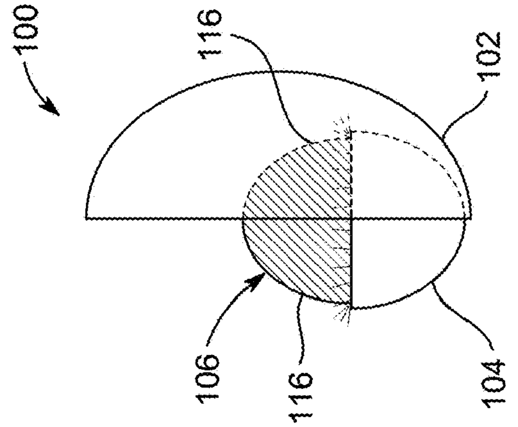
FIG. 3D is an illustration of a fourth configuration of different possible configurations achieved during implementation of the lighting unit, according to the first embodiment.
Figure 3C:
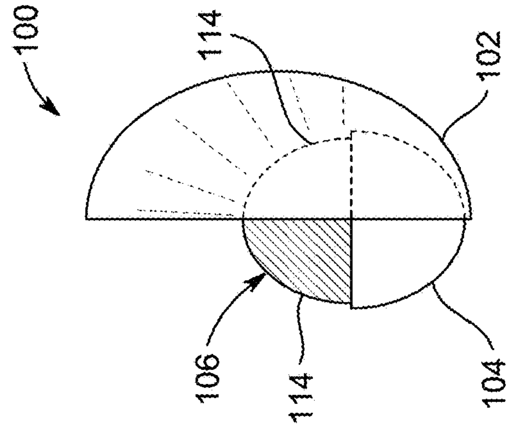
FIG. 3C is an illustration of a third configuration of different possible configurations achieved during implementation of the lighting unit, according to the first embodiment.
Figure 3B:
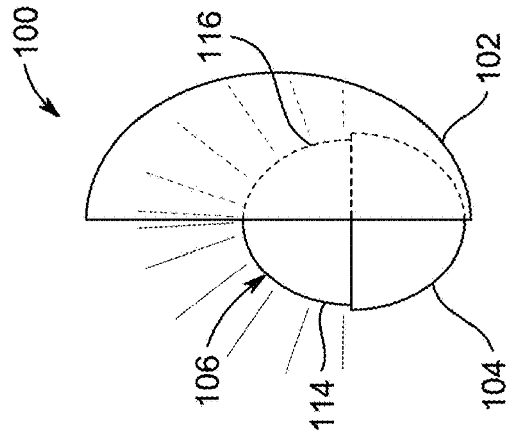
FIG. 3B is an illustration of a second configuration of different possible configurations achieved during implementation of the lighting unit, according to the first embodiment.
Figure 3A:
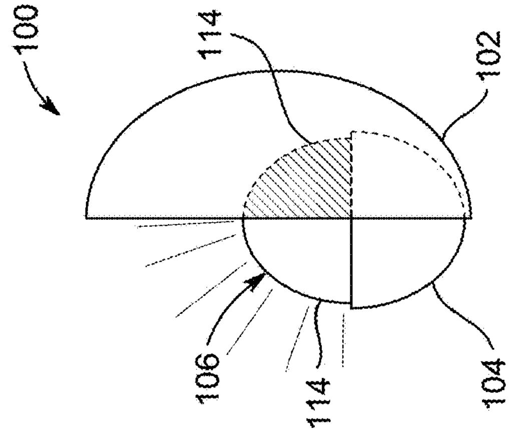
FIG. 3A is an illustration of a first configuration of different possible configurations achieved during implementation of the lighting unit, according to the first embodiment.

Referring to FIGS. 3A-3D, four of the possible configurations providing different lighting effects are depicted, as achieved by rotation of the sphere 106 in 90 degrees intervals along the direction of the horizontal rotation 'A'. Herein, FIG. 3A provides a first configuration of the lighting unit 100. In this first configuration, the sphere 106 is oriented such that half of the translucent portion 114 is externally visible, protruding from the hollow hemispherical body 102. Simultaneously, half of the opaque portion 116 is also externally visible but is positioned inside the hollow hemispherical body 102, concealed by it. The remaining halves of the translucent portion 114 and the opaque portion 116 are concealed within the hemispherical holder 104. This configuration results in a significant amount of light being emitted directly from the lighting unit 100, and is suitable for tasks that require a high degree of illumination, such as reading, administering medication, or any activity that necessitates clear visibility.

FIG. 3B provides a second configuration of the lighting unit 100. In this second configuration, the entire translucent portion 114 of the sphere 106 is exposed, allowing for maximum light emission. Simultaneously, the opaque portion 116 is fully concealed within the hemispherical holder 104, ensuring no blockage of emitted light to the environment. This configuration results in the highest degree of direct illumination, and is suitable for activities that require intense lighting, such as effectively illuminating a pathway in a dim environment, ensuring safe navigation.

FIG. 3C provides a third configuration of the lighting unit 100. In this third configuration, half of the opaque portion 116 is exposed outside of the hollow hemispherical body 102. Simultaneously, half of the translucent portion 114 is positioned inside the hollow hemispherical body 102, concealed by it. The other halves of both the translucent portion 114 and the opaque portion 116 are located within, and thus concealed by, the hemispherical holder 104. This configuration provides an indirect light emission, creating a more relaxed ambiance, and is suitable for providing relaxation environment, such as when a non-disruptive illumination is preferred.

FIG. 3D provides a fourth configuration of the lighting unit 100. In this fourth configuration, the entire opaque portion 116 of the sphere 106 is exposed, while the translucent portion 114 is fully concealed within the hemispherical holder 104. This configuration minimizes light emission (only light leaking from gap between the hemispherical holder 104 and the sphere 106). This configuration provides a very low, indirect lighting effect, and is especially suitable for scenarios where minimal illumination is desired, such as during sleep, ensuring that the environment remains dimly lit without causing any disturbances.

Each of these configurations, achieved by the strategic rotation of the sphere 106, offers users the ability to tailor the lighting effect to their immediate needs. It may be appreciated that the lighting unit 100 may achieve numerous other configurations by not limiting the rotations to 90 degrees intervals. Further, the sphere 106 can rotate in multiple directions, and also not just horizontally, by varying the orientation of the rod 120 in the hemispherical holder 104, ensuring the lighting unit 100 remains versatile in its operation.

Figure 4:
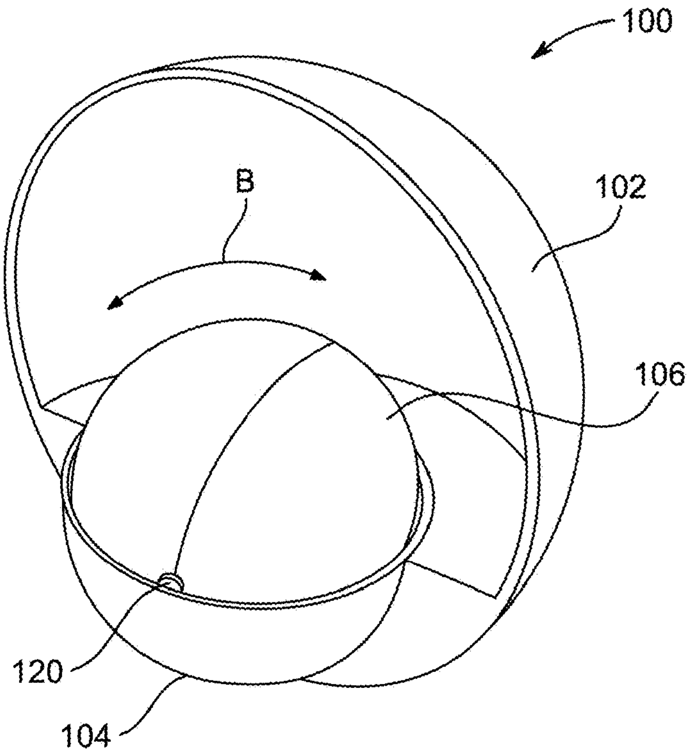
FIG. 4 is an illustration of implementation of the lighting unit, according to a second embodiment.

In a second embodiment of the lighting unit 100, as illustrated in FIG. 4, the hemispherical holder 104 includes the rod 120 disposed across a diameter perpendicular to the hollow hemispherical body 102 upon which the sphere 106 rotates horizontally. This perpendicular arrangement of the rod 120 provides the sphere 106 with a distinct axis of rotation, enabling it to rotate horizontally (as represented by double-sided arrow 'B') but in a manner that the direction of emitted light shifts in a plane perpendicular to the hollow hemispherical body 102. The horizontal rotation 'B' allows that the light can be directed to a wide range of angles. Such a design is especially beneficial when users wish to illuminate areas to the sides of the lighting unit 100 without physically moving the entire unit.

Figure 5:
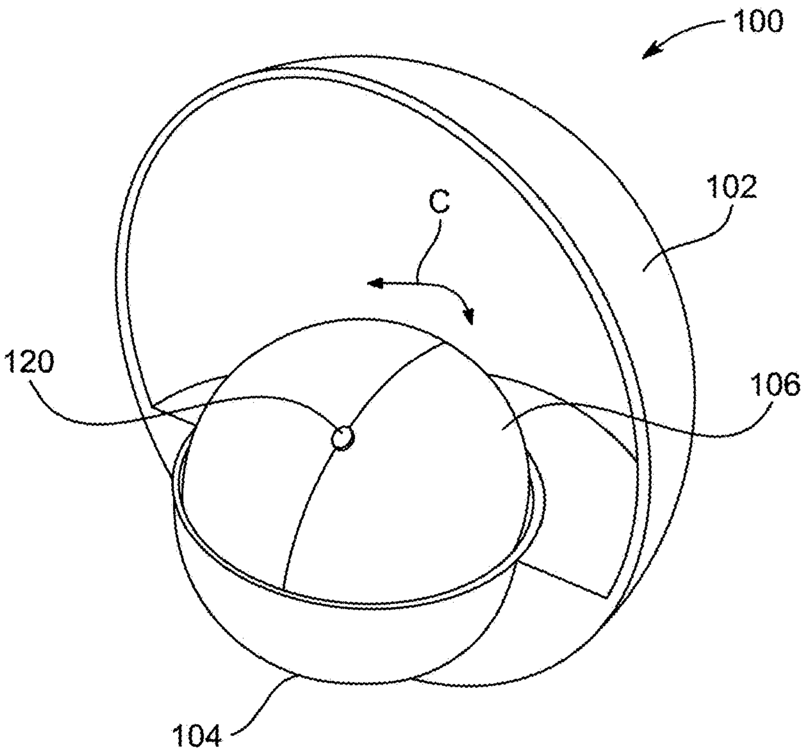
FIG. 5 is an illustration of implementation of the lighting unit, according to a third embodiment.

In a third embodiment of the lighting unit 100, as illustrated in FIG. 5, the hemispherical holder 104 includes the rod 120 disposed vertically from a bottom of the hemispherical holder 104 upon which the sphere 106 rotates vertically. Herein, the hemispherical holder 104 incorporates the rod 120 that is disposed vertically, originating from, and fixed to the bottom of the hemispherical holder 104. This vertical arrangement of the rod 120, which serves as the axis for the sphere 106, enables the sphere 106 to rotate in direction of a vertical plane providing vertical rotation (as represented by double-sided arrow 'C'). Further, in this embodiments, the sphere 106 may be oriented such that one halves of the translucent portion 114 and the opaque portion 116 are located externally to the hemispherical holder 104, and other halves are concealed by it. This configuration provides for medium light which may either be fully, directly illuminating the environment, or fully, indirectly illuminating the environment.

In some embodiments, a portion of the perimeter of the bottom half 108 of the hollow hemispherical body 102 is flat and configured to be placed on a surface. That is, the hollow hemispherical body 102 includes a flat portion 128 around its perimeter at its bottom half 108, which is designed to allow the hollow hemispherical body 102 be placed steadily on a surface, such as a nightstand, a floor, or a table. By incorporating this design feature of the flat portion 128, the hollow hemispherical body 102 can stably rest on flat or even slightly uneven surfaces, ensuring that the lighting unit 100 remains stationary during use. The flat portion 128 ensures that the lighting unit 100 rests securely without any wobble or risk of tipping over. Further, the flat portion 128 can be aesthetically pleasing, in comparison to the traditionally curved form of a hemisphere.

Figure 6:
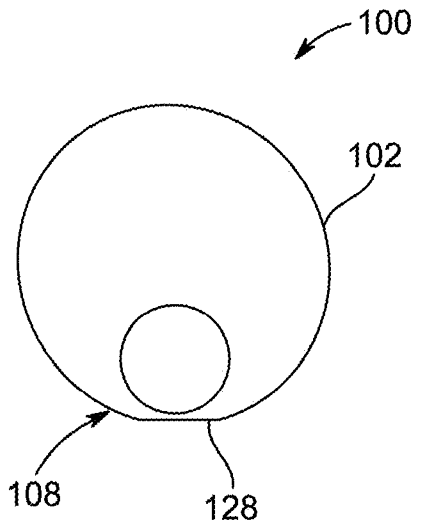
FIG. 6 is a diagrammatic simplified view of the lighting unit depicting flatness of a portion of a perimeter of a hollow hemispherical body therein, according to one embodiment.
Figure 7:
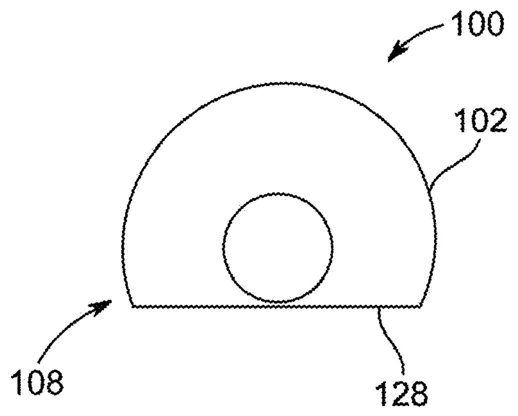
FIG. 7 is a diagrammatic simplified view of the lighting unit depicting flatness of the portion of the perimeter of the hollow hemispherical body therein, according to another embodiment.

In certain embodiments, the flatness of the flat portion 128 can vary in its extent, covering anywhere from approximately 10% to as much as 100%, preferably 20%, 30%, 40%, 50%, 60%, 70%, 80%, or about 90% of the perimeter at its bottom half 108. FIG. 6 provides a simplified diagrammatic view of the lighting unit 100 with the flat portion 128 being about 10% of the perimeter at the bottom half 108 of the hollow hemispherical body 102. Conversely, FIG. 7 provides a simplified diagrammatic view of the lighting unit 100 with the flat portion 128 being about 100% of the perimeter at the bottom half 108 of the hollow hemispherical body 102. This offers the flexibility to cater to diverse aesthetic and functional preferences of the user, like whether the user desires a slight flat edge or a fully flat edge for the flat portion 128.

Referring back to FIG. 1G, as illustrated, in some embodiments, the lighting unit 100 incorporates a base weight 130 positioned directly below the flat portion 128 of the hollow hemispherical body 102. The base weight 130 adds substantial weight to the bottom of the lighting unit 100, enhancing its stability. This ensures that the lighting unit 100 remains firmly placed, reducing the risk of it being easily toppled or displaced, for example during implementation when the user may be rotating the sphere 106 therein. Additionally, the base weight 130 also serves to lower center of gravity of the lighting unit 100, providing a more balanced structure. The lighting unit 100 further includes a base cover 132 to effectively conceal the underside of the lighting unit 100, offering a neat and polished appearance. The base cover 132 may be equipped with screw holes, allowing for easy and secure attachment. Further, to ensure the base cover 132 remains firmly affixed to the bottom of the lighting unit 100, screws 134 are employed.

Figure 8:
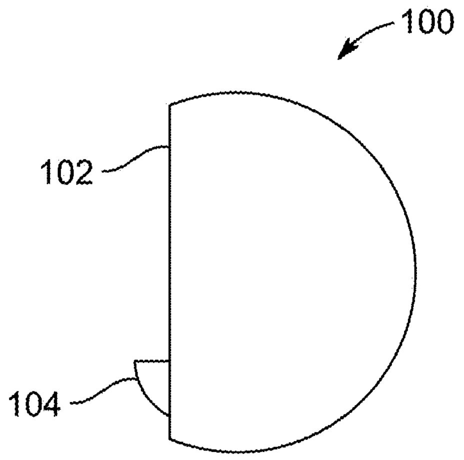
FIG. 8 is a diagrammatic simplified view of the lighting unit depicting protrusion of a hemispherical holder from the hollow hemispherical body therein, according to one embodiment.
Figure 9:
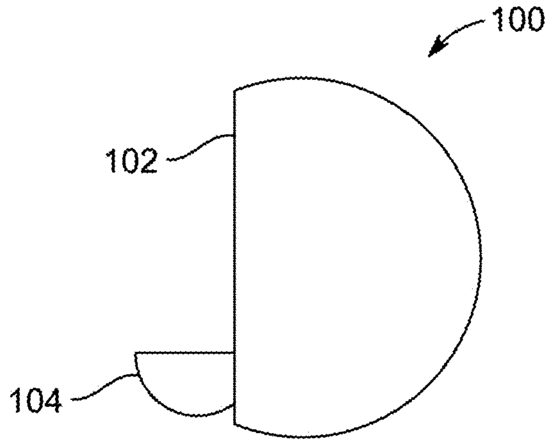
FIG. 9 is a diagrammatic simplified view of the lighting unit depicting protrusion of the hemispherical holder from the hollow hemispherical body therein, according to another embodiment.

Also, it may be appreciated that the positioning or protrusion of the hemispherical holder 104 with respect to the hollow hemispherical body 102 may provide some variations in the design of the lighting unit 100. This extent of protrusion can be varied based on user preference or design considerations. In certain embodiments, a portion of the hemispherical holder 104 protrudes from the hollow hemispherical body 102. In other embodiments, half of the hemispherical holder 104 protrudes from the hollow hemispherical body 102. In general, the hemispherical holder 104 may protrude anywhere from a minimal 10% to a significant 95%, preferably 20%, 30%, 40%, 50%, 60%, 70%, 80%, or about 90% of its total structure from the hollow hemispherical body 102. FIG. 8 provides a simplified diagrammatic view of the lighting unit 100 with the hemispherical holder 104 protruding about 10% from the hollow hemispherical body 102. Conversely, FIG. 9 provides a simplified diagrammatic view of the lighting unit 100 with the hemispherical holder 104 protruding about 95% from the hollow hemispherical body 102. This offers the flexibility to cater to diverse aesthetic and functional preferences of the user, like adding an element of depth and dimension. This can also influence the direction and spread of the emitted light, allowing for unique lighting effects depending on the extent of the protrusion.

The lighting unit 100 of the present disclosure provides flexibility in size to ensure that it can be adapted to cater to a diverse range of spaces, environments, and user preferences. Referring to FIGS. 1C-1F, as illustrated, the lighting unit 100, or specifically the hollow hemispherical body 102 therein, may have an overall height 'H' of about 20-100 cm, preferably 30-90 cm, 40-80 cm, 50-70 cm, or about 60 cm and a width 'W' of about 20-100 cm, preferably 30-90 cm, 40-80 cm, 50-70 cm, or about 60 cm. A radius 'R1' of the sphere 106 is 20-100 mm, preferably 30-90 mm, 40-80 mm, 50-70 mm, or about 60 mm, and a radius 'R2' of the hemispherical holder 104 is about 20-100 mm, preferably 30-90 mm, 40-80 mm, 50-70 mm, or about 60 mm to be able to accommodate the sphere 106 therein. Preferably, the sphere has a same radius or a radius 1-5 mm, preferably 2-4 mm or about 3 mm smaller than the radius "R2" of the hemispherical holder 104. It should be expressly noted that while specific embodiments of the lighting unit 100 have been described herein, the dimensions of the lighting unit 100 are not strictly confined to those presented. In fact, the dimensions of the lighting unit 100 can vary widely without any limitations.

The lighting unit 100 of the present disclosure offers several advantages over traditional lighting fixtures. The lighting unit 100 providing ability to the users to simply rotate the sphere 106 to adjust the direction and intensity of light as per their needs, makes it very user-friendly. The flat portion 128 of the perimeter of the hollow hemispherical body 102 ensures that the lighting unit 100 remains stable on flat surfaces, making it suitable for such environments. The interchangeable translucent portion 114 provides the added advantage of setting the mood or ambiance. The compact and aesthetic design of the lighting unit 100 makes it a suitable addition to various settings, from homes to offices; and combined with its functional benefits, makes the lighting unit 100 a preferred choice over traditional, stationary lighting fixtures.

The lighting unit 100, with its innovative design and functionality, is particularly beneficial for individuals, like senior citizens, seeking a conducive sleep environment while still maintaining the presence of light. The ability to conveniently regulate the emission and direction of light by manipulating the position and orientation of the sphere 106 enables users to control the impact of emitted light during sleep time. Moreover, the user-friendly and versatile nature of the lighting unit 100 allows individuals to perform various tasks before and during sleep with convenience. For instance, users can engage in activities like reading or meditation before bedtime with adequate illumination and then transition into a dimly lit sleeping environment by simply varying the position of the sphere 106.

Numerous modifications and variations of the present disclosure are possible in light of the above teachings. It is therefore to be understood that within the scope of the appended claims, the present disclosure may be practiced otherwise than as specifically described herein.

The invention claimed is:

1. A lighting unit, comprising:

a hollow hemispherical body;

a hemispherical holder; and a sphere, wherein a center of a bottom half of the hollow hemispherical body comprises the hemispherical holder which is configured to hold the sphere, wherein the sphere comprises:

a light source;

a translucent portion; and an opaque portion, wherein the light source is disposed inside of the sphere, wherein the sphere is configured to rotate within the hemispherical holder so as to vary a position of light emitted by the light source through the translucent portion, and wherein the hemispherical holder is connected to the hollow hemispherical body by a shelf so as to cover an entirety of the bottom half of the hollow hemispherical body, and wherein the shelf fills a space between the hollow hemispherical body and the hemispherical holder such that there is no gap between the hollow hemispherical body and the hemispherical holder.

2. The lighting unit of claim 1, wherein a portion of a perimeter of the bottom half of the hollow hemispherical body is flat and configured to be placed on a surface.

3. The lighting unit of claim 1, wherein a portion of the hemispherical holder protrudes from the hollow hemispherical body.

4. The lighting unit of claim 1, wherein half of the hemispherical holder protrudes from the hollow hemispherical body.

5. The lighting unit of claim 1, wherein the hemispherical holder comprises a rod disposed across a diameter parallel to the hollow hemispherical body upon which the sphere rotates horizontally.

6. The lighting unit of claim 1, wherein the hemispherical holder comprises a rod disposed across a diameter perpendicular to the hollow hemispherical body upon which the sphere rotates horizontally.

7. The lighting unit of claim 1, wherein the hemispherical holder comprises a rod disposed vertically from a bottom of the hemispherical holder upon which the sphere rotates vertically.

8. The lighting unit of claim 1, wherein at least one of the hemispherical holder and the hollow hemispherical body is made of an opaque material.

9. The lighting unit of claim 1, wherein the translucent portion is 1-99% of a surface area of the sphere.

10. The lighting unit of claim 1, wherein the translucent portion is at least one color selected from white, red, green, blue, yellow, pink, purple or orange.

11. The lighting unit of claim 1, wherein the translucent portion is operably interchangeable so as to change a property of the light emitted by the light source through the translucent portion.

12. The lighting unit of claim 1, wherein the translucent portion of the sphere is made of a material selected from glass, plastic, and fabric.

13. The lighting unit of claim 1, wherein the opaque portion of the sphere is made of a material selected from metal, wood, cement, porcelain, ceramic, and plastic.

14. The lighting unit of claim 1, wherein the lighting unit is electrically connected to a power source so as to power the light source.

15. The lighting unit of claim 1, wherein the light source is motion, sound, or mechanically activated.

16. The lighting unit of claim 1, wherein the light source is selected from incandescent, compact fluorescent (CFL), halogen, and light-emitting diode (LED).

17. The lighting unit of claim 8, wherein the opaque material is selected from metal, wood, cement, porcelain, ceramic, and plastic.

18. The lighting unit of claim 14, wherein the power source is a battery or an electrical outlet.

* * * * *